United States Patent [19]

Inoue

[11] Patent Number: 5,273,637

[45] Date of Patent: * Dec. 28, 1993

[54] ELECTRODEPOSITION COATING SYSTEM

[75] Inventor: Akito Inoue, Tokyo, Japan

[73] Assignee: Poly Techs, Inc., Tokyo, Japan

[*] Notice: The portion of the term of this patent subsequent to Jan. 7, 2009 has been disclaimed.

[21] Appl. No.: 970,230

[22] Filed: Nov. 2, 1992

Related U.S. Application Data

[63] Continuation of Ser. No. 514,722, Apr. 26, 1990, abandoned.

[30] Foreign Application Priority Data

Aug. 9, 1989 [JP] Japan .................... 1-93592

[51] Int. Cl.⁵ .......................... C25C 7/04; C25D 13/04
[52] U.S. Cl. ................... 204/282; 204/299 EC; 204/301
[58] Field of Search ............... 204/299 EC, 300 EC, 204/301, 282

[56] References Cited

U.S. PATENT DOCUMENTS

| | | | |
|---|---|---|---|
| 3,419,488 | 12/1968 | Cooke | 204/180.8 |
| 4,469,564 | 9/1984 | Okinaka et al. | 204/15 |
| 4,515,674 | 5/1985 | Takahashi | 204/290 R |
| 4,663,016 | 5/1987 | Takahashi et al. | 204/299 EC |
| 4,711,709 | 12/1987 | Inoue | 204/282 |
| 4,834,861 | 5/1989 | Inoue | 204/299 EC |
| 4,851,102 | 7/1989 | Inoue | 204/299 EC |
| 4,879,013 | 11/1989 | Austin | 204/299 EC |
| 4,933,051 | 6/1990 | Kline | 204/238 |
| 5,078,850 | 1/1992 | Inoue | 204/299 EC |

FOREIGN PATENT DOCUMENTS 59-89798 5/1984 Japan .
59-193299 11/1984 Japan .
61-199574 12/1986 Japan .

OTHER PUBLICATIONS

"Paint Technique", pp. 139-143, published on Sep. 1, 1988 by Kabushiki Kaishi Rico Shuppansha and an English language translation.

Primary Examiner—John Niebling
Assistant Examiner—Kishor Mayekar
Attorney, Agent, or Firm—Sandler Greenblum & Bernstein

[57] ABSTRACT

An electrodeposition coating system widely used in an automatic coating process of a motor vehicle and the like. This system comprises: an article to be coated as being a first electrode, which is disposed in an electrodeposition bath; and at least two second electrodes provided in association with the article; and current is passed between the both sets of electrodes through an aqueous solution of a substance for forming a coating film contained in the bath to thereby electrodeposit the substance onto the article. The second electrodes consist of two groups of electrodes, the electrodes of a first group out of these second electrodes include electrode members constituted by corrosion-resisting members, each of these electrode members is integrally provided with a first membrane position therearound for precluding most of the flow of an ionized neutralizing agent contained in the aqueous solution, which is attracted by the electrode members, and the electrodes of a second group include electrode members which are each integrally provided with a second membrane portion therearound, for osmotically extracting the neutralizing agent.

6 Claims, 5 Drawing Sheets

ELECTRODEPOSITION COATING SYSTEM

This application is a continuation of application Ser. No. 07/514,722, filed Apr. 26, 1990, now abandoned.

BACKGROUND OF THE INVENTION

1. Field of the Invention

This invention relates to an electrodeposition coating system, and more particularly to an electrodeposition coating system comprising a first electrode immersed in an aqueous solution of a substance for forming a coating film and a second electrode provided in association with the first electrode, the second electrode having an electrode member which is provided with a membrane portion for separating the electrode member from the first electrodes and the aqueous solution.

2. Description of the Prior Art

The electrodeposition coating is broadly divided into two including one using a boating material of anion type and the other using a coating material of cation type. Since, in either of these electrodeposition coatings, uniformity and adhesion of the coating on an article to be coated are excellent and the degree of causing pollution is low, these electrodeposition coatings have recently been widely applied to the automatic coating film treatment of motor vehicle bodies and so forth for example, particularly as suitable ones in the prime coating or one coat finishing for the coating of metal materials.

Out of the coating materials used in these electrodeposition coatings, as the coating material of anion type, one, in which carboxyl group is adhered to resin having a molecular weight (MW) of 2000 so as to be water-soluble, is used, while, as the aforesaid coating material of cation type, one, in which amino group is attached to a resin component of the coating material so as to be water-soluble, is used. On the other hand, even with these water-soluble coating materials, the degrees of ionization after being dissolved in the water are very low. For this, at present, in the case of the coating material of anion type, an alkaline neutralizing agent such for example as triethylamine is mixed thereinto, while, in the case of the coating material of cation type, an acidic neutralizing agent such as acetic acid is mixed thereinto, whereby, in the both cases; neutralizing is effected, respectively, to thereby increase the degrees of ionization in the water.

The neutralizing agents are mixed for increasing the degrees of ionization in accordance with the properties of the resin components of the respective coating materials as described above. On the other hand, when the electrodeposition treatment of the articles to be coated advances to decrease the resin component in the solution, the coating material should be successively supplied from the outside. Accordingly, in the solution, there is accumulated amine or acetic acid as the neutralizing agent, whereby a phenomenon such as redissolving of the coated surface or occurrence of pin holes is generated, so that the efficiency of the electrodeposition coating is impaired to a considerable extent.

For this, recently, as described in Japanese Patent Kokoku (Post-Exam. Publn.) NO. 22231/1970 for example, such a so-called PH control is performed for increasing the efficiency that, one electrode is separated from the article as being the other electrode and an aqueous solution by use of an ion-exchange membrane or the like, and amine or acetic acid is osmotically extracted by use of the ion-exchange membrane or the like, to thereby prevent the neutralizing agent from increasing in the aqueous solution.

The electrodeposition of cation type using a coating material of cation type will hereunder be described.

In the electrodeposition of cation type, there has been used an anion exchange membrane as a membrane. This anion exchange membrane normally has a value of $8-10 \times 10^{-6}$ (mol/Coulomb) as an electric efficiency of removing the acid (Coulomb acid removing rate).

The acid (neutralizing agent) added to the aqueous solution (ED bath coating material) in the electrodeposition bath amounts to a value A contained in the coating material supplied to the electrodeposition bath.

On the other hand, the acid taken out from the ED bath coating material to the outside totally amounts to a value B, which includes:

(1) 10-20% of the value A taken out as the acid contained in a UF filtrate used as a rinsing liquid after the electrodeposition coating.
(2) 50-10% of the value A taken out as the acid contained in the coating film.
(3) 70-80% of the value A, which is removed by the membrane electrodes.

Although it is ideal that the value A is equal to the value B, it is difficult to adjust to obtain such an equality. In general, B>A is adopted, whereby, if needed, a small amount of acid is added to the bath to keep exact acid balance.

For this reason, when all of the electrodes provided in the electrodeposition bath are turned to be the membrane electrodes for extracting acid, removal of the acid becomes highly excessive, whereby such disadvantages are presented that the acid as being the neutralizing agent lacks and the acid needs to be periodically supplied from the outside and so forth, so that the control of the neutralizing agent in the ED bath coating material becomes troublesome and the acid is uselessly consumed. For this, nowadays, some of the electrodes are constituted by so-called bare electrodes having no membranes, so that removal of the acid can be well balanced.

As described above, when the rate of removal is $8-10 \times 10^{-6}$ (mol/Coulomb), removal of the acid becomes excessive and when the rate of removal is $5-6 \times 10^{-6}$ (mol/coulomb), removal of the acid becomes ideally balanced, so that a neutral membrane having the latter rate of acid removal may be used sometimes.

However, the technique of using the bare electrodes as some of the electrodes in the above-described example of the prior art presents the following serious disadvantages in view of meeting the requirement for high quality finishing of coating in recent years.

Namely, a sludge mainly containing an inorganic pigment educed on the surfaces of the bare electrodes is problematical and useful components in the coating material tend to contain a component facilitating the electrolytic corrosion of the electrodes (in general, there are many cases where SUS 316 are used), thereby causing a drastic electrolytic corrosion during current passage. Normally the rate of electrolytic corrosion of SUS 316 is about $2-3 \times 10^{-6}$ (g/Colulomb) to the passing current, however, in the above case, the rate of electrolytic corrosion may reach even $100-150 \times 10^{-6}$ (g/Coulomb).

As described above, there have been presented such disadvantages that heavy metal ions (Fe, Cr, Ni, etc.)

and the like, which are melted out of the electrodes due to the electrolytic corrosion, are mixed into the coating material, whereby surface roughening of a coated surface, lowered rust prevention, coloring by the heavy metals and so forth are caused.

Furthermore, even in the case of use of the neutralizing film in the above-described example of the prior art, the disadvantages same as above have been presented because the neutralizing film allows the components, the heavy metal ions and the like, which facilitate the electrolytic corrosion, to pass therethrough.

SUMMARY OF THE INVENTION

The present invention has been developed to obviate the above-described disadvantages of the prior art and has as its object to provide an electrodeposition coating system capable of maintaining the quality of coating and easily adjusting the value of acid in the electrodeposition coating.

To achieve the above-described object, according to the present invention, in the electrodeposition coating system comprising a first electrode provided in an electrodeposition bath and at least two second electrodes provided in association with the first electrode, wherein current is passed between the first electrode and the second electrode through an aqueous solution of a substance for forming a coating films as contained in the electrodeposition bath to thereby electrodeposit the substance onto the first electrode, the second electrodes are constituted by two groups of electrodes, a first group of electrodes out of these two groups includes electrode members consisting of corrosion-resisting members, the electrode members are each integrally provided with a first membrane portion around each of the electrode members and disposed at a given interval, for precluding most of the flow of an ionized neutralizing agent in the aqueous solution, which is attracted by the electrode members, and a second group of electrodes includes electrode members and the electrode members are each integrally provided with a second membrane portion around each of the electrode members and disposed at a given interval, for osmotically extracting the neutralizing agent. The above-described object is to be achieved by this arrangement.

DETAILED DESCRIPTION OF THE EMBODIMENTS

The first embodiment of the invention will hereunder be described with reference to FIGS. 1 to 4.

FIRST EMBODIMENT

This embodiment shows a case where the electrodeposition coating system according to the invention is used in the cation electrodeposition coating using an aqueous solution W obtained by neutralizing the cation type coating by acetic acid as the aqueous solution of the substance for forming a coating film.

Figure 1A:
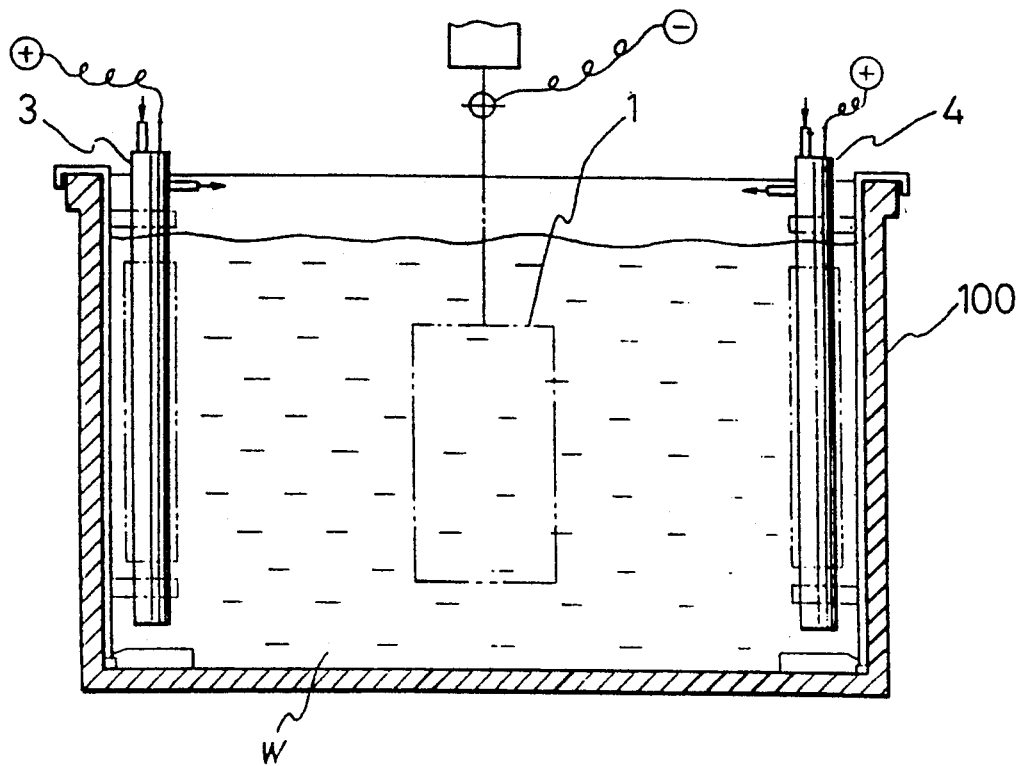
FIG. 1(A) is an explanatory view showing the arrangement of a first embodiment of the present invention.
Figure 1B:
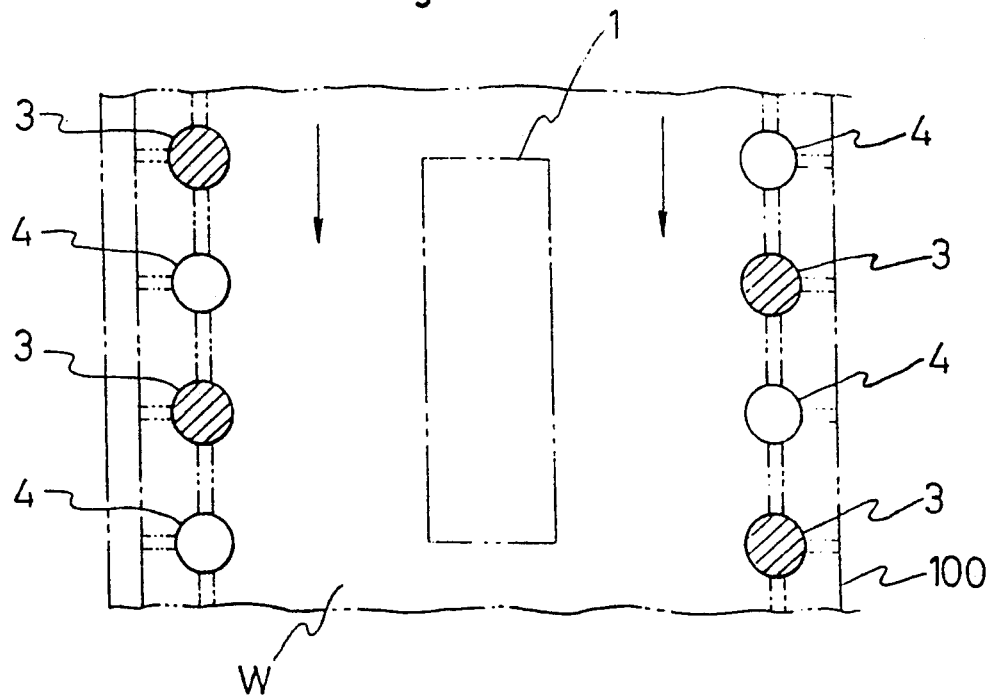
FIG. 1(B) is a plan view of FIG. 1A.

Referring to FIG. 1, an article 1 to be coated as being the first electrode is provided at the central portion of an electrodeposition bath 100. A plurality of second electrodes are disposed at a side wall portion of the electrodeposition bath 100 in association with the article 1. Namely, these second electrodes have two groups of electrodes including neutralizing agent precluding-type membrane electrode devices 3,3 . . . as a first group of electrodes and neutralizing agent extracting type membrane electrode devices 4, 4 . . . as a second group of electrodes.

In this embodiment, the respective membrane electrode devices 3 and 4 respectively constituting the groups are disposed alternately along both side wall portions of the electrodeposition bath 100 as shown in FIG. 1.

As the neutralizing agent precluding-type membrane electrode device 3, there is used one having a tubular electrode member consisting of a corrosion resisting member (for example, iridium oxide or the like is coated on titanium ally; a material having an excellent quality such as ferrite is used), and having the first membrane portion for precluding most of the flow of the ionized neutralizing agent in the aqueous solution, which is attracted by the electrode members. As the neutralizing agent extracting-type membrane electrode device 4, there is used one having a tubular electrode member made of stainless steel and having the second membrane portion for osmotically extracting the neutralizing agent in the aqueous solution W for the electrodeposition coating (an aqueous solution of the cation type coating) which is contained in the electrodeposition bath 100. Here, the arrangements of these membrane electrode devices 3 and 4 are substantially identical in general arrangement with each other.

Figure 2:
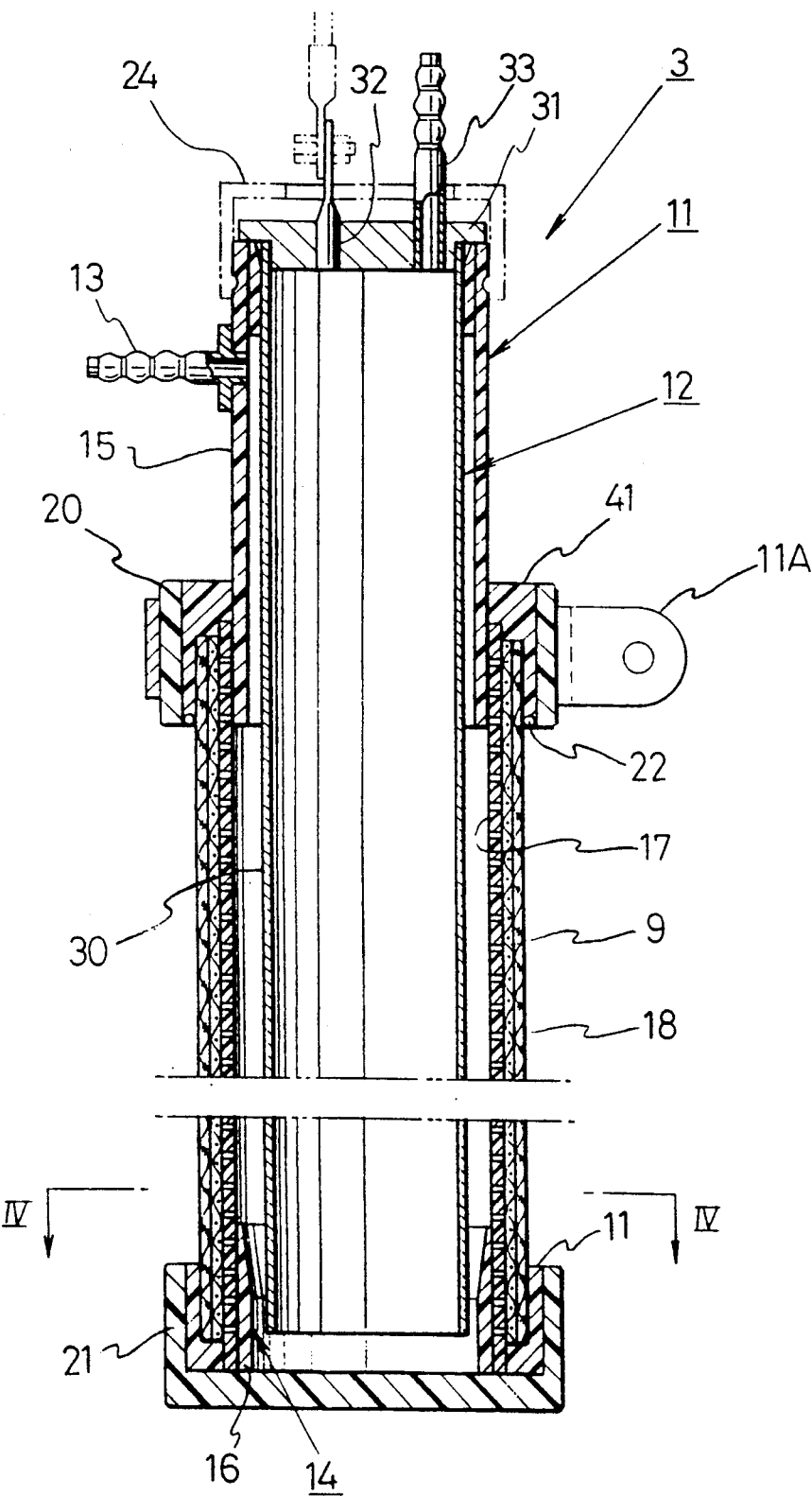
FIG. 2 is a sectional view showing the detailed arrangement of some of the membrane electrode devices provided with the first membrane portion used in the above embodiment.

FIG. 2 shows a detailed arrangement of the membrane electrode device 3 which includes a body portion 11, an electrode portion 12 as being a second electrode and a water passing mechanism 14 comprising a gap or the like interposed therebetween.

The body portion 11 is constituted by a first and a second insulating tubes 15 and 16, which are provided at a given interval on the same axis, a relatively rigid membrane support member 17 for connecting the insulating tubes 15 and 16 to each other, a cation exchange film 9 as being the first membrane portion wound around the outer periphery of this membrane support member 17, and an outer cloth 18 further wound around the outer periphery of this cation exchange film 4. As this outer cloth 18, one made of chemical fibers or the like for example, having satisfactory durability to a tensile force, and being water-permeable is used.

The membrane support member 17 is of a non-conductive mesh-like member or a water-passing porous member and formed into a relatively long tubular form, and connected to the first and second insulating tubes 15 and 16 at the inner diametral sides of the opposite end portions thereof.

Figure 3:
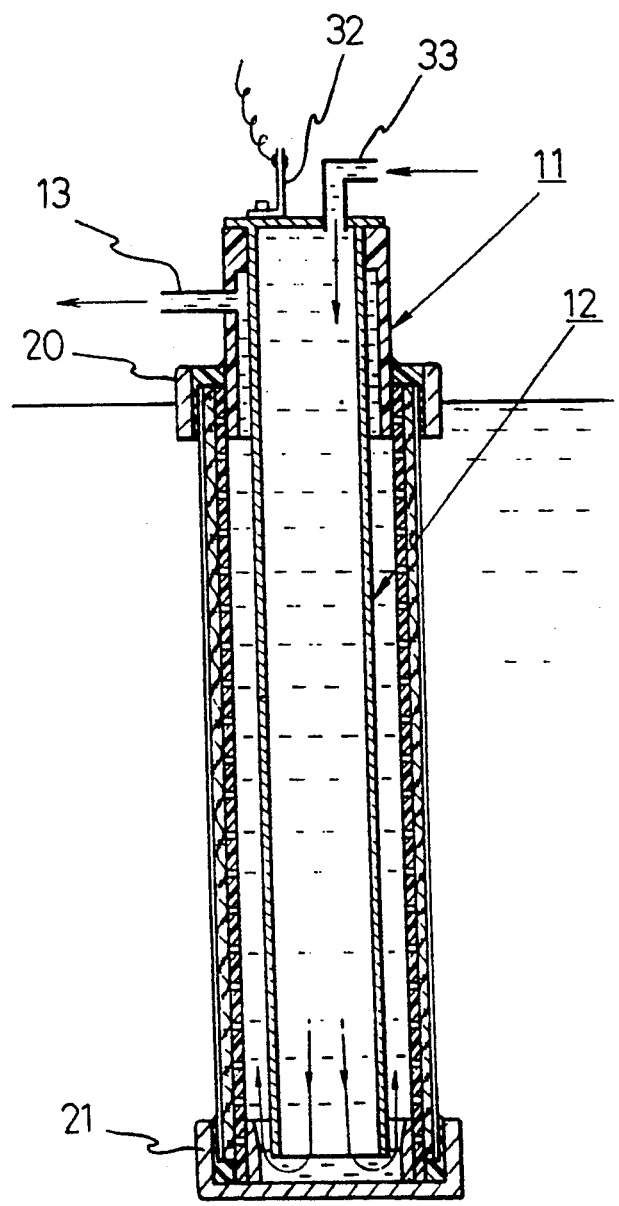
FIG. 3 is an explanatory view showing the flow channel of water in the device shown in FIG. 2.

As shown in FIG. 3, the cation exchange film 9 is formed into a cylindrical form and is wound around the outer periphery of the membrane support member 17 as described hereinafter.

The cation exchange film 9 is thus wound around the membrane support member 17, so that it is considerably reinforced in the mechanical strength against the external pressure. Further, the outer cloth 18 is spirally wound around the outer peripheral surface of this cation exchange film 9 as described above, whereby it is given a satisfactory strength against the internal pressure.

As shown in FIG. 2, a first and a second frame bodies 20 and 21 are provided at a given interval on the outer peripheries of the opposite end portions of the membrane support member 17 wound therearound with the cation exchange film 7 and the outer cloth 18 and, at the same time, the inner diametral sides of these frame bodies 20 and 21 are filled up with potting material 41, so that the insulating tubes 15, 16, the membrane support member 17, the cation exchange film 7 and the outer cloth 18 are simultaneously and firmly integrated with one another. In this case, the first frame body 20 is formed into a tubular form, and, in filling the potting material 41, in order to prevent the potting material 41 before being solidified from flowing out, a ring member 22 is provided in the first frame body 20.

The second frame body 21 is formed into a bottomed tubular form, the potting material 41 is filled in a state where the membrane support member 17, the insulating tube 16 and the like are inserted into the second frame body 21 as described above, and all of the above members are simultaneously and integrally fixed to one another.

In this embodiment, as the potting material 41, epoxy resin is used, however, urethane resin, phenol resin or the like may be used as well.

In this embodiment, as the first and second insulating tubes 15 and 16, rigid tubes of vinyl chloride resin are used. Out of these tubes, as shown in FIG. 2, the first insulating tube 15 is provided with a water discharge portion 13 and detachably provided at the top end portion thereof with a cap 24. Designated at 15A is a spacer secured to the inner diametral side of the top end portion of the insulating tube 15.

On the other hand, the electrode portion 12 is constituted by a tubular electrode member 30 made of titanium, the outer periphery of which is coated with iridium oxide a metallic lid member 31 provided at the top end portion thereof shown in FIG. 2, for suspendingly engaging the electrode, a connecting terminal 32 for a power source and a water feed portion 33. Out of these, the outer diameter of the electrode member 30 is further smaller than the inner diameter of each of the insulating tubes 15 and 16 of the body portion 11. For this, mounting to the body portion 11 of the electrode member 30 and demounting therefrom are easily performed, and a portion of the water passing mechanism 14 is formed between the body portion 11 and the electrode member 30. The end edge of the outer periphery of the metallic lid member 31 is raised from the electrode member 30, whereby the electrode member 30 is engaged with the first insulating tube 15 as shown in FIG. 2. For this, the electrode proton 12 can be very easily inserted into the body portion 11 from the outside, and can be very easily detached to the outside as necessary.

The water passing mechanism 14 is to be used for discharging acetic acid and the like accumulated between the cation exchange film 9 and the electrode member 30 to the outside, and specifically, is constituted by the above-described electrode portion 12 and the body portion 11. More specifically, water which is caused to flow through the water feed portion 33 of the electrode portion 12 flows down through the electrode member 30 as indicated by an arrow in FIG. 3, flows to the outer periphery of the electrode member 30 from the bottom thereof, while rising along the outer periphery of the electrode member 30, flows at the inner side of the cation exchange film 9, and is forced to flow together with the impurities to the outside through the discharge portion 13.

Wound around a portion of the frame body 20 at one end of the frame body 11 is a fixture 11A for mounting the frame body 20 to the bath for the electrodeposition coating. The outer cloth 18 wound around the outer surface of the cation exchange film 9 need not necessarily be limited to the cloth-like one, and the outer cloth may be replaced by any other member only if the member is identical in the reinforcing function and the water permeability with the outer cloth. Further, the cation exchange film 9 may be one which is wound spirally on the premise that the joint portion is made waterproof.

A method of fixing the cation exchange film 9 constituting the main portion of the above-described body portion 11 will hereunder be described in further detail.

Figure 4:
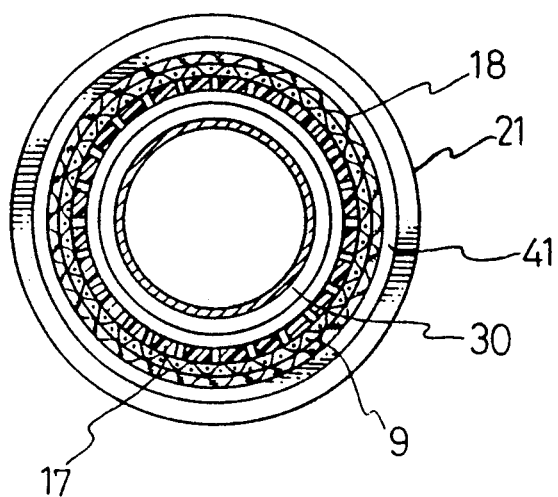
FIG. 4 is a sectional view taken along the line IV—IV in FIG. 2.

Firstly, the cation exchange film 9 is wound around the outer periphery of the membrane support member 13, and opposite end edges of the cation exchange film 9 are abutted against each other, whereby the cation exchange film 9 is secured in a generally circular shape in section as shown in FIG. 4.

Subsequently, the outer cloth 18 is spirally wound around the outer surface of this cation exchange film 9, whereby integration of the membrane support member 10 and the cation exchange film 9 is completed. Subsequently, the first and second insulating tubes 15 and 16 are coupled to opposite end portions of the tubular membrane portion formed as described above as shown in FIG. 2, and simultaneously, the first and the second frame bodies 20 and 21 are provided at an interval on the outside of the respective coupled portions as aforesaid. The potting material 41 is filled in the frame bodies 20 and 21, and solidified therein, whereby the body portion 11 is completely integrated.

Incidentally, the ring member 22 provided at the inner side of the bottom end of the first frame body 20 in FIG. 2 is intended for preventing the potting member 41 before being solidified from flowing out as aforesaid, and therefore, the ring member 22 may be removed after the potting material 41 is solidified.

As described above, the membrane electrode device 4 is substantially identical in general arrangement with the membrane electrode device 3, however, the former uses an anion exchange film (not shown) as the second membrane portion in place of the cation exchange film 9, and uses an ordinary tubular electrode member made of stainless steel in place of the electrode member 30. Other respects in the construction are identical with the above-described membrane electrode device 3.

The general operations of this embodiment will hereunder be described.

Firstly, the article 1 is turned into a negative pole and the respective electrode members of the membrane electrode devices 3,3 . . . and 4,4 . . . are turned into positive poles, and, when DC voltage is applied thereto, the electrodeposition coating is started at once as usual, the component of coating resin and colloidal molecular of the pigment, which have positive electric charge in the aqueous solution, move toward the article 1 as being the negative pole, adhere to the surface of the article 1, and are discharged, and thereafter, solid matters agglomerate to form a coating film.

On the other hand, such a state is brought about that acetic acid having negative charge is accumulated in the aqueous solution W. Simultaneously with the aforesaid start of the electrodeposition coating, this acetic acid begins to move toward the respective electrode members of the membrane electrode devices 3,3 . . . 4,4 . . . Here, since each of the membrane electrode devices 4 uses an anion film easily permeating the molecules of acetic acid having negative charge, the molecules of acetic acid attracted by the electrode member of the membrane electrode device 4 having positive charge are easily permeated through the anion exchange film along the electronic line of force, reach the electrode member from around the electrode member, and are discharged. In this case, almost all of the value of the discharged neutralizing agent is ionized at the low concentration, whereby the neutralizing agent is attracted by the positive pole during the passage of current, so that the neutralizing agent is accumulated between the electrode member and the anion exchange film.

Now, demineralized water is forced to flow between this electrode member and the anion exchange film for example as aforesaid, whereby the accumulated acetic acid is continuously discharged to the outside together with the demineralized water.

In contrast thereto, in each of the membrane electrode devices 3, the cation exchange film 9 is used, whereby the Coulomb acid removing rate is as low as $1 \times 10^{-6}$ (g/Coulomb) or therebelow. Most of the flow of acetic acid (minus ions) as being the neutralizing agent in the aqueous solution W is precluded by this cation exchange film 9 and cannot reach the electrode 30, and the acetic acid is accumulated in the aqueous solution for the electrodeposition. In this case, minus charge cannot move from the side of the aqueous solution W to the side of the electrode member 30. However, since hydrogen ions ($H^+$) produced by the ionization of acid in the polar liquid previously filled in a space formed between the electrode member 30 and the cation exchange film 9 are attracted by the article 1 and permeated through the cation exchange film 9, these hydrogen ions carry the plus charge to allow the current to be passed.

However, since the acetic acid cannot be completely precluded by this cation exchange film 9, part of the acetic acid reaches the electrode 30 and is discharged. Similarly to the above-described case, the acetic acid is accumulated in the space formed between the electrode 30 and the membrane portion 9, and the accumulated acetic acid is continuously discharged to the outside together with the demineralized water.

Since the electrode 30 of the membrane electrode device 3 is made of titanium and coated on the surface thereof with iridium oxide, very little heavy metal ions are melted out from the electrode member 30.

As described above, in this first embodiment, there are used the membrane electrode device 3 which suppresses the acid removing rate and allows very little electrode to melt out and the membrane electrode device 4 which can remove the acid effectively and precludes the flow of the plus ions produced, by the melt-out of the electrode, so that such advantages are achieved that excessive removal of the acid as being the neutralizing agent, which has been problematical, can be prevented and mixing of the heavy metal ions by the melt-out of the electrode into the coating component (ED bath coating material) in he aqueous solution for the electrodeposition can be precluded substantially completely. In addition, the membrane electrode devices 3 and 4 can be suitable combined with each other, so that the acid removing rate can be set at a desirable value.

Incidentally, in the above embodiment, when a polar liquid circulation system of the membrane electrode device 3 is separated from a polar liquid circulation system of the membrane electrode device 4, the polar liquid of the membrane electrode device 4 is not fed to the membrane electrode device 3, so that mixing of the heavy metal into the bath coating can be prevented substantially completely.

Embodiments of the invention other than the above-described first embodiment will hereunder be described.

Incidentally, in the description of the following embodiments, same reference numerals are used to designate same or similar component parts corresponding to ones as shown in the first embodiment, so that description will be omitted or simplified.

SECOND EMBODIMENT

Figure 5:
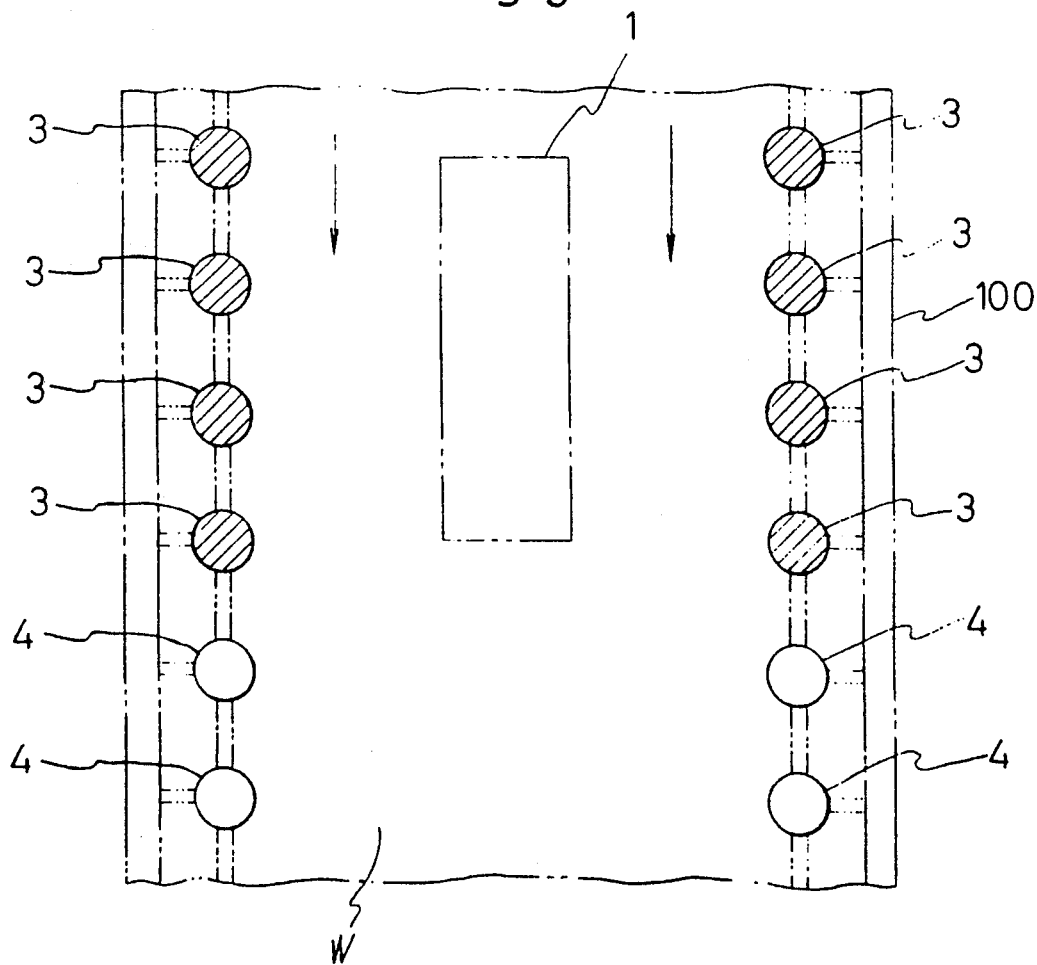
FIG. 5 is a plan view in explanation of a second embodiment of the invention.

FIG. 5 shows the second embodiment of the present invention.

This second embodiment features that the article 1 is transferred from one side (top side in FIG. 5) of the electrodeposition bath 100 to the other side (bottom side in FIG. 5) in the aqueous solution W in the electrodeposition bath 100 by a transfer means, not shown, the membrane electrode devices 3,3 . . . in the above embodiment are provided at the incoming side of the bath, and the membrane electrode devices 4,4 . . . are provided at the outgoing side of the bath.

The above-described action and effects in the second embodiment are substantially similar to those in the first embodiment. However, in this embodiment, the current density per article is higher at the incoming side of the bath than at the outgoing side of the bath, so that the excessive removal of acid can be prevented more effectively.

THIRD EMBODIMENT

Figure 6:
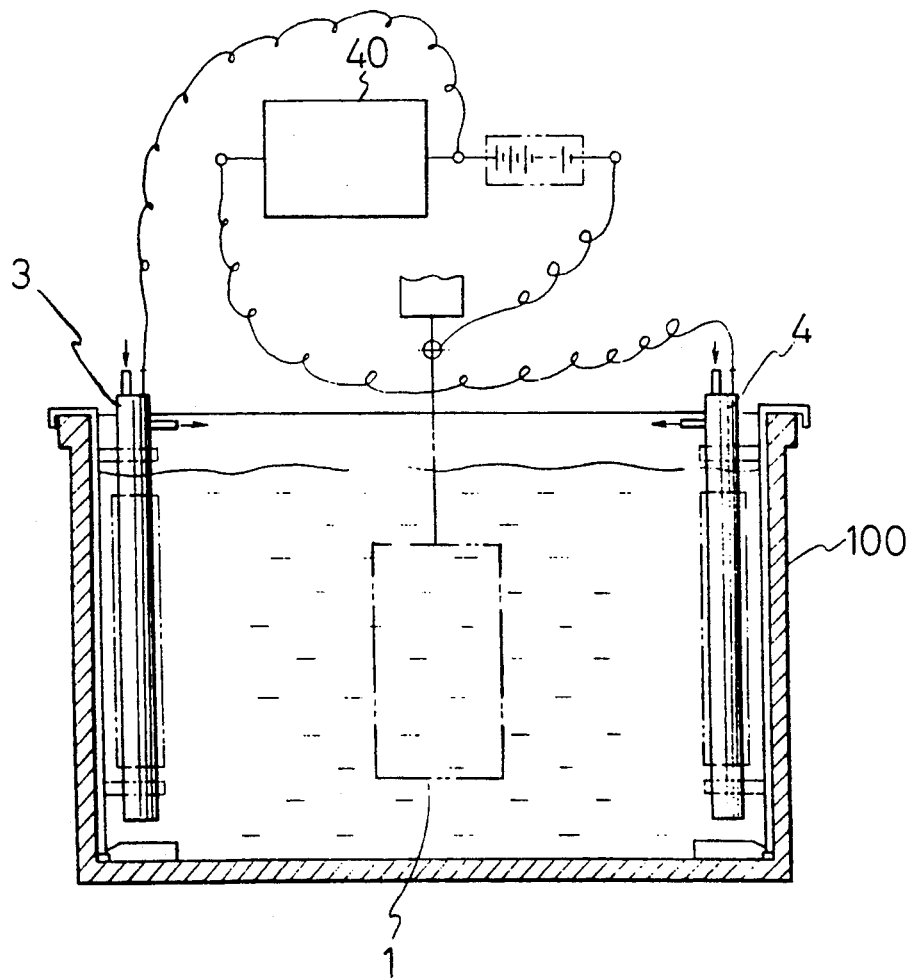
FIG. 6 is a side view showing a third embodiment of the invention.

FIG. 6 shows the third embodiment of the invention.

This embodiment features that a voltage regulating means 40 for regulating a voltage applied is provided between the membrane electrode devices 3,4 . . . and the article 1 in the above-described first embodiment. Other respects of the arrangement are similar to those in the above-described first embodiment.

Even with this arrangement, the action and effects similar to those in the first embodiment are obtained, and moreover, the voltage applied between the respective membrane electrode devices and the article 1 can be regulated through the agency of the voltage regulating means 40, so that such an advantage can be achieved that the value of acid in the electrodeposition bath 100 can be adjusted more easily.

Incidentally, in the above embodiments, the case where the electrodes constituting the second electrodes each include the tubular electrode member has been shown as the example, however, the present invention should not necessarily be limited to this, and a box-type electrode member may be included, in which case, completely same effects can be achieved. In the above embodiments, there has been shown as the example the case where the electrode member constituting the membrane electrode device 3 as the electrode in the first group is formed of the corrosion-resisting material and the electrode member constituting the membrane electrode device 4 as the electrode in the second group is made of the normal stainless steel. However, the both electrode members may be formed of the corrosion-resisting material.

Since the present invention is constructed and functions as described above, when the present invention is used in the cation electrodeposition coating as in the above embodiments for example, excessive removal of the acid as being the neutralizing agent in the aqueous solution can be suppressed through the agency of the second electrodes of the first group having the first membrane portion, simultaneously, the acid in the aqueous solution can be osmotically extracted and removed through the agency of the second electrodes of the second group having the second membrane portion, and further, the electrode members constituting the electrodes of the first group are formed of the corrosion-resisting members, whereby the electrodes do not melt out, so that the heavy metal and the like do not flow into the aqueous solution.

Accordingly, such unprecedented outstanding electrodeposition coating system capable of easily adjusting the value of the acid as being the neutralizing agent in the electrodeposition bath can be provided.

I claim:

1. An electrodeposition coating system comprising:
   a first electrode provided in an electrodeposition bath and;
   at least two second electrodes provided in association with said first electrode;
   wherein current is passed between said first electrode and said second electrodes through an aqueous solution of a substance for forming a coating film as contained in the electrodeposition bath to electrodeposit the substance to said first electrode, characterized in that said second electrodes are constituted by two groups of electrodes, a first group of electrodes of said two groups including electrode members consisting of corrosion-resisting members, said electrode members each being integrally provided with means for precluding most of a flow of an ionized neutralizing agent in the aqueous solution, which is attracted by said electrode member, and a second group of electrodes including electrode members integrally provided with means for osmotically extracting the neutralizing agent.

2. The electrodeposition coating system as set forth in claim 1, wherein the electrode members constituting the electrodes of said first group each comprise a titanium alloy having an outer surface upon which a material excellent in corrosion-resisting properties is coated.

3. The electrodeposition coating system as set forth in claim 1, wherein the electrode members constituting the electrodes of said first group are each made of ferrite.

4. The electrodeposition coating system as set forth in claim 1, wherein said first electrode is transferred from an incoming side of the electrodeposition bath to an outgoing side in the aqueous solution in the electrodeposition bath, and the electrodes of said first group are disposed at the incoming side of the bath and the electrodes of said second group are disposed at the outgoing side of the bath.

5. The electrodeposition coating system as set forth in claim 1, wherein at least one of the second electrodes is connected to a voltage regulating means for regulating a voltage applied.

6. The electrodeposition coating system as set forth in claim 2, wherein said material excellent in corrosion-resisting properties comprises iridium oxide.

* * * * *